United States Patent [19]
Yeon

[11] Patent Number: 6,133,712
[45] Date of Patent: Oct. 17, 2000

[54] BATTERY CHARGE CONTROLLER HAVING AN ADJUSTABLE TERMINATION CURRENT

[75] Inventor: Sang-Heum Yeon, Suwon, Rep. of Korea

[73] Assignee: Fairchild Korea Semiconductor Ltd., Kyungki-do, Rep. of Korea

[21] Appl. No.: 09/376,845

[22] Filed: Aug. 18, 1999

[30] Foreign Application Priority Data

Aug. 21, 1998 [KR] Rep. of Korea ...................... 98-33989

[51] Int. Cl.[7] .................................................. H02J 7/00
[52] U.S. Cl. ........................... 320/145; 320/160; 320/164
[58] Field of Search .................................... 320/141, 140, 320/145, 162, 163, 164; 363/41; 323/273, 274, 282, 351

[56] References Cited

U.S. PATENT DOCUMENTS

| | | | |
|---|---|---|---|
| 5,382,893 | 1/1995 | Dehnel | 320/160 |
| 5,402,055 | 3/1995 | Nguyen | 320/160 |
| 5,625,275 | 4/1997 | Tanikawa et al. | 320/160 |
| 5,701,068 | 12/1997 | Baer et al. | 320/119 |

*Primary Examiner*—Peter S. Wong
*Assistant Examiner*—Gregory J. Toatley, Jr.
*Attorney, Agent, or Firm*—Marshall, O'Toole, Gerstein, Murray & Borun

[57] ABSTRACT

A battery charge controller has charge termination values that can be adjusted according to the initial charging current values so that charging is discontinued at a same charge level for all battery cells to prevent overcharging and undercharging. The battery charge controller includes a DC/DC converter that is coupled to a supply voltage and that provides a charging current to a battery, and a gain controller coupled to the DC/DC converter. The gain controller provides first and second gain-adjusted signals associated with the charging current. The charge controller further includes a charge termination detector that compares the level of the second gain-adjusted signal to a first predetermined reference signal and based on the comparison generates a charge termination signal. A pulse-width controller is coupled to the DC/DC converter. The pulse-width controller compares the charge termination signal, the first gain-adjusted signal, and a charging voltage of the battery to a second predetermined reference signal to vary a duty cycle of the DC/DC converter to vary the charging current supplied to the battery

9 Claims, 5 Drawing Sheets

BATTERY CHARGE CONTROLLER HAVING AN ADJUSTABLE TERMINATION CURRENT

BACKGROUND OF THE INVENTION

1. Field of the Invention

The invention relates generally to a battery charger. More particularly, the invention relates to a battery charge controller having an adjustable termination current.

2. Description of Related Technology

Batteries may be generally classified as either rechargeable or non-rechargeable. For instance, lithium-ion batteries, lead-acid batteries, and nickel-cadmium batteries are rechargeable batteries. As is widely known, rechargeable batteries are capable of storing a finite amount of charge (i.e., energy). Thus, as electrical energy is conveyed to a rechargeable battery during the charging process, a charge termination point is reached at which the battery cannot store any additional energy. Supplying electrical energy to a rechargeable battery that has reached the charge termination point can severely reduce the operating life of the battery because the additional electrical energy provided to the battery is dissipated as heat within the battery.

Because overcharging a rechargeable battery can significantly reduce the operating life of the battery, battery chargers that are adapted to discontinue the charging of the battery at the charge termination point are highly advantageous. In fact, some battery chargers have a charge controller that determines the charge termination point to discontinue the charging of the battery. One such type of charge controller monitors battery charging current to determine the input impedance of the battery being charged. Charge controllers that determine battery impedance to control the charging process are based on the fact that battery impedance increases as the charge level of the battery approaches the charge termination point. Additionally, these types of battery chargers often include user adjustments for adjusting an initial maximum charging current and have a termination/minimum charging current that is fixed at a constant value. For example, in charging a lithium-ion battery the initial current is typically varied between 500 mA to 1 A and the termination current is set at a fixed value in the range of 50 mA to 100 mA. Thus, when the charging current detected by the charge controller reaches 50 mA to 100 mA, the charge controller controls the battery charger to terminate the charging current so that no additional energy is provided to the battery.

In applications requiring high-capacity rechargeable batteries, such as notebook computers, the initial current and termination current must also be set. In some high capacity applications a plurality of rechargeable batteries are configured in parallel so that the initial charging current is determined based on the initial charging current required per battery multiplied by the number of batteries that are coupled in parallel. In conventional battery chargers the initial current value can be adjusted based on the total capacity of the rechargeable battery; however, the termination current is generally fixed at a constant value regardless of the capacity of the rechargeable battery. As a result, the rechargeable battery may be undercharged or overcharged and, in the case of overcharging, the life span of the battery can be significantly reduced.

FIG. 1 is a graph illustrating the relationship between the charging current and charging time for conventional charge control techniques. Curves (1), (2), and (3) correspond to rechargeable batteries having different capacities. For example, curves (1), (2), and (3) may represent the charging characteristic for a single battery cell, two battery cells, and three battery cells, respectively. Accordingly, each of the curves (1), (2), and (3) shows an initial charging current that is proportional to the total battery capacity. Namely, curve (1) represents the smallest capacity and has the smallest initial charging current Imax1, curve (2) represents the next largest battery capacity and has a proportionally larger initial charging current Imax2, and curve (3), which represents the largest battery capacity, has the largest initial charging current Imax3. As shown in FIG. 1, each of the curves (1), (2), and (3) has the same charge termination current Imin.

Thus, FIG. 1 illustrates a conventional charge termination control technique that is based on using the fixed charge termination current Imin regardless of the charge capacity of the battery being charged. As can be seen in FIG. 1, the fixed termination current Imin causes the charging time to vary proportionally with the battery capacity. Additionally, the fixed termination current can result in overcharging of the battery depending on the capacity of the battery being charged because the per cell impedance for a given termination current increases as the capacity (i.e., the number of cells) increases. Namely, as the termination current on a per cell basis decreases, the final impedance and the charge level increase on a per cell basis.

For instance, if the termination current is fixed at 100 mA, which may be appropriate for a single battery cell, and the battery being charged consists of four parallel connected battery cells then each battery cell receives 25 mA at the termination point, which is indicative of a high impedance and charge level that could result in a damaging overcharged condition. In contrast, if the charge termination current of 400 mA, which may be appropriate for four cells, is used to terminate the charging of a single cell, the battery cell receives 400 mA at the termination point, which is indicative of a low impedance and charge level that could result in an undercharged condition.

SUMMARY OF THE INVENTION

The invention provides a battery charge controller in which charge termination values can be adjusted according to the initial charging current values so that charging is discontinued at a substantially identical charge level for all battery cells, thereby preventing overcharging and undercharging of the battery.

The battery charge controller includes a DC/DC converter that is coupled to a supply voltage and that provides a charging current to the battery, and a gain controller coupled to the DC/DC converter, wherein the gain controller provides first and second gain-adjusted signals associated with the charging current. The charge controller further includes a charge termination detector compares the level of the second gain-adjusted signal to a first predetermined reference signal and generates a charge termination signal based on the comparison. A pulse-width controller coupled to the DC/DC converter compares each of the charge termination signal, the first gain-adjusted signal and a charging voltage of the battery to a second predetermined reference signal to vary a duty cycle of the DC/DC converter to vary the charging current supplied to the battery.

The pulse-width controller may reduce the duty cycle of the DC/DC converter based on the comparison of the first gain-adjusted signal to the second reference signal to limit the charging current to a maximum charging current. The pulse-width controller may also turn off the DC/DC converter to stop charging the battery when the charging current reaches a minimum charging current based on the comparison of the charge termination signal to the second reference signal. The ratio of the maximum and minimum charging currents is preferably a constant value.

The invention itself, together with further objects and attendant advantages, will best be understood by reference to the following detailed description, taken in conjunction with the accompanying drawings.

DETAILED DESCRIPTION OF THE PREFERRED EMBODIMENTS

Figure 1:
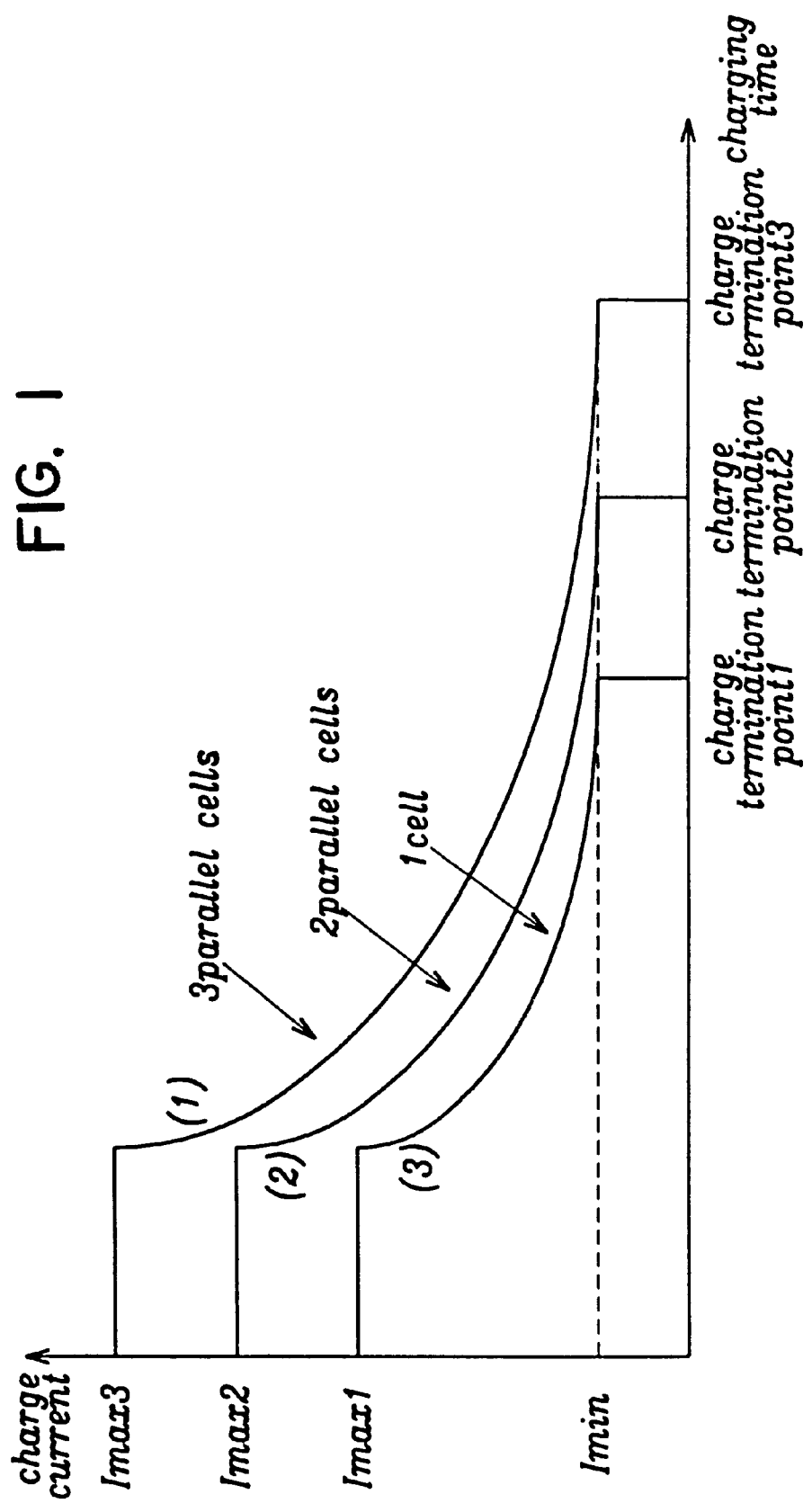
FIG. 1 illustrates a conventional charge termination control technique that is based on using a fixed charge termination current regardless of the charge capacity of the battery being charged.
Figure 2:
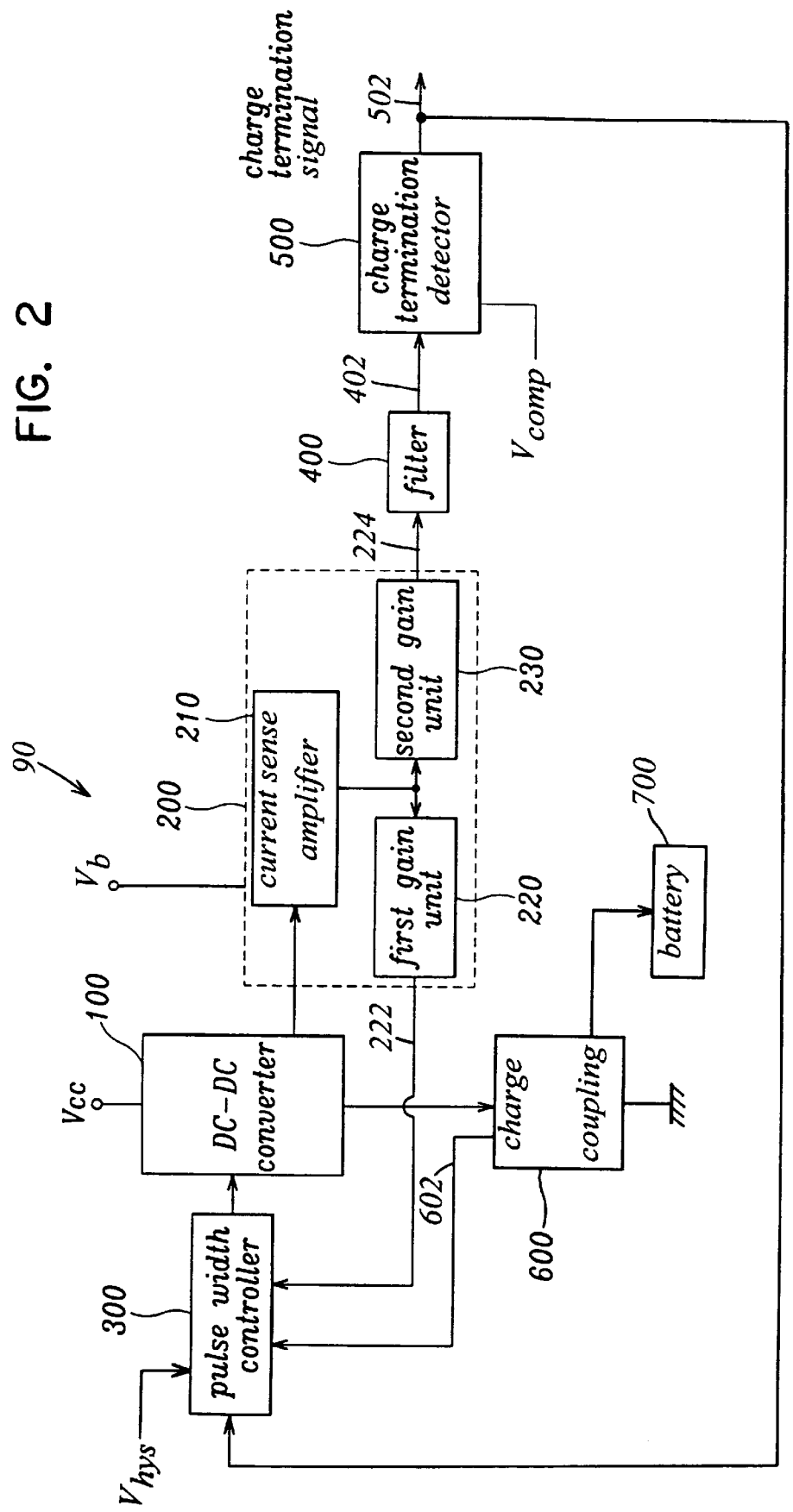
FIG. 2 illustrates a block diagram of a charge controller according to the invention.

FIG. 2 illustrates a block diagram of a charge controller 90 according to the invention. The charge controller 90 includes a DC/DC converter 100, a gain controller 200 having a current sense amplifier 210, a first gain unit 220, and a second gain unit 230. The charge controller further includes a pulse-width controller 300, a filter 400, a charge termination detector 500, and a charge coupling 600. The charge controller 90 provides energy via the charge coupling 600 to charge a battery 700.

In general, the pulse-width controller 300 receives signals associated with the charging of the battery 700 from the charge coupling 600, the gain controller 200, and the charge termination detector 500. The pulse-width controller 300 provides the DC/DC converter 100 with pulse-width modulated control signals to cause the DC/DC converter 100 to convert a supply voltage Vcc into a desirable charging current and/or voltage for a load, which in this case is the battery 700. The charge status of the battery 700 is based on the charging current and voltage, which is provided by the DC/DC converter 100 to the battery 700.

The charge controller 200 monitors the charging current provided to the battery 700 and generates first and second gain-adjusted signals 222, 224 that are representative of the charging current. As discussed in more detail below, a reference voltage Vb is provided to the charge controller 200, which, at least partially, determines the relationship between the charging current and the first and second gain-adjusted signals 222, 224. Additionally, the charge coupling 600 monitors the charging voltage 602 of the battery 700 and routes the charging voltage 602 to the pulse-width controller 300.

The pulse-width controller 300 compares both the first gain-adjusted signal 222 and the charging voltage 602 to a reference voltage Vhys. Based on the comparisons, the pulse-width controller 300 modulates the duty cycle of the DC/DC converter 100 to vary the charging current supplied to the battery 700. For example, if the first gain-adjusted signal 222 exceeds the reference voltage Vhys then the pulse-width controller 300 decreases the duty cycle of the DC/DC converter 100 so that the average current supplied to the battery 700 is reduced, thereby maintaining the charging current below a desired level. Similarly, if the charging voltage provided by the charge coupling 600 exceeds the reference voltage Vhys the duty cycle of the DC/DC converter 100 will be reduced to maintain the charging voltage below a desired level.

The charge controller 200 provides the second gain-adjusted signal 224 to the filter 400. The filter 400 is preferably a low-pass filter that is specifically adapted to remove ripple components from the second gain-adjusted signal 224. The charge termination detector 500 receives a filtered second gain-adjusted signal 402 and compares it to a reference voltage Vcomp. If the filtered second gain-adjusted signal 402 falls below the reference voltage Vcomp the charge termination detector generates a charge termination signal 502, which is coupled to the pulse-width controller 300. Upon receiving the charge termination signal 502, the pulse-width controller 300 turns the DC/DC converter 100 off to terminate the charging process of the battery 700.

Figure 3:
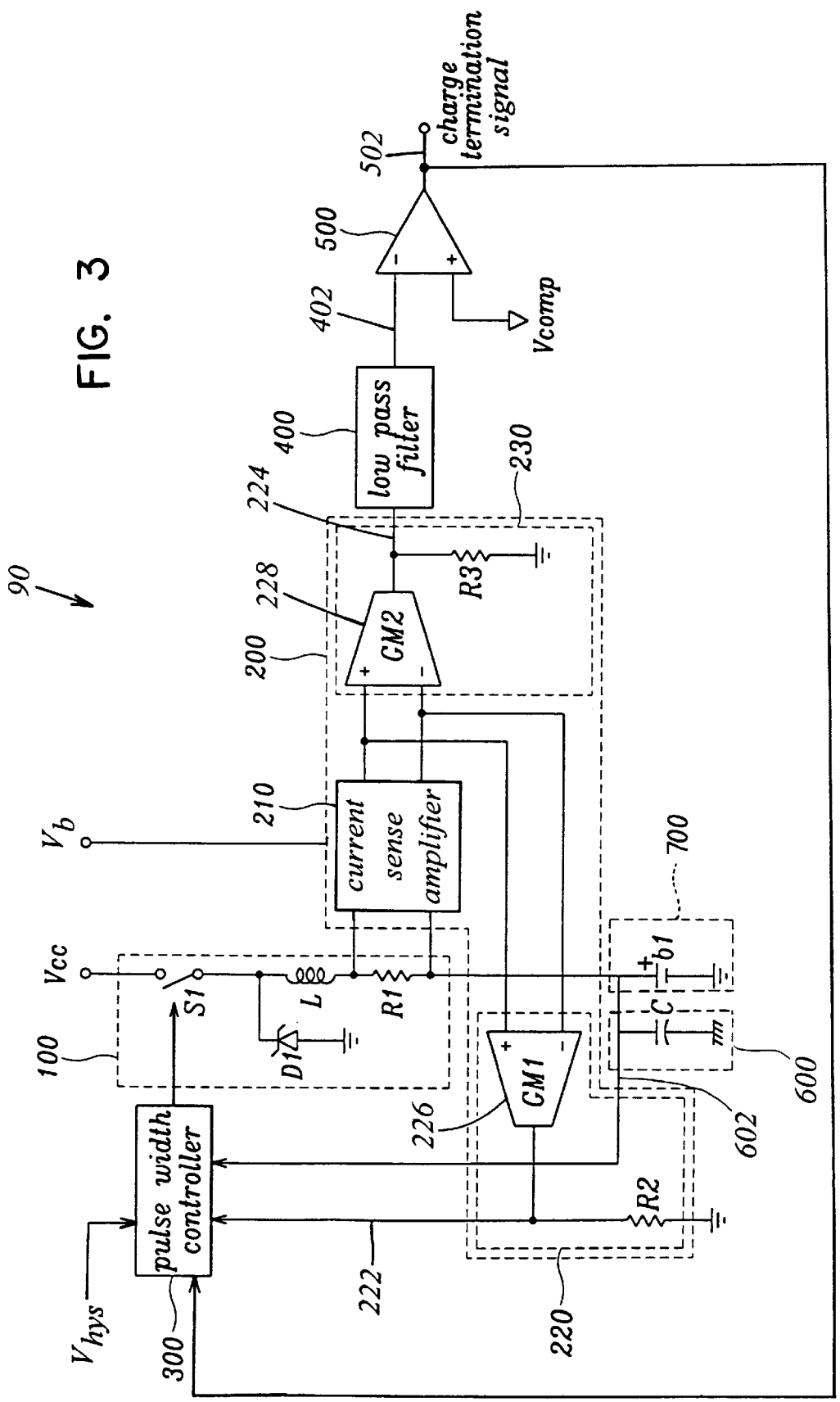
FIG. 3 is an exemplary schematic diagram of the charge controller of FIG. 2.

FIG. 3 is an exemplary schematic diagram of the charge controller 90 of FIG. 2. As illustrated in FIG. 3, the DC/DC converter 100 is configured as a buck-type switching regulator having a switch S1, which is turned on/off by the pulse-width controller 300, an inductor L, and a freewheeling diode D1, all coupled together as shown. The DC/DC converter 100 additionally includes a current sensing resistor R1 that provides a voltage signal representative of the charging current to the gain controller 200.

The gain controller 200 receives the voltage signal from the current sense amplifier 210 and generates via the first and second gain units 220, 230 the respective first and second gain-adjusted signals 222, 224 based, at least in part, on the value of the reference voltage Vb. The output of the current sense amplifier 210 is coupled to the inputs of first and second transconductance amplifiers 226, 228 that drive respective resistors R2, R3 to produce the first and second gain-adjusted signals 222, 224, which in this case are voltage signals.

In operation, the pulse-width controller 300 varies the duty cycle of the switch S1 to vary the average charging current flowing through the inductor L, the current sense resistor R1, and into the battery 700. The current sense amplifier 210 provides a signal representative of the charging current flowing into the battery 700 to the first transconductance amplifier 226. The first transconductance amplifier 226 drives the resistor R2 to generate the first gain-adjusted signal 222, which is a voltage representative of the charging current flowing into the battery 700. As the charging current increases, the voltage of the first gain-adjusted signal 222 increases, and if the voltage of the first gain-adjusted signal 222 exceeds the reference voltage Vhys the pulse-width controller 300 reduces the duty cycle of the switch S1, thereby reducing the charging current supplied to the battery 700 to maintain the charging current to below a desired maximum (e.g., Imax).

The current sense amplifier 210 also provides a signal representative of the charging current flowing into the battery 700 to the second transconductance amplifier 228. The second transconductance amplifier 228 drives the resistor R3 to generate the second gain-adjusted signal 224, which is a voltage representative of the charging current. The filter 400 removes ripple components from the second gain-adjusted signal 224 and applies the filtered gain-adjusted signal 402 to the inverting input of the charge termination detector 500. The charge termination detector 500 compares the filtered gain-adjusted signal 402 to the reference voltage Vcomp and when the filtered signal 402 level falls below the reference voltage Vcomp, the level of the charge termination signal 502 transitions to a logical high level, which causes the pulse-width controller 300 to turn off the switch S1 to terminate the charging of the battery 700. Because the level of the filtered second gain-adjusted signal 402 decreases as the charging current decreases, the charge termination detector 500 will assert the charge termination signal 502 at some minimum charging current (e.g., Imin), which is associated with a desired maximum charge condition in the battery 700.

The charge coupling 600 includes a capacitor C that is connected in parallel to the battery 700 and to the charging voltage 602 that is applied to the pulse-width controller 300. The capacitor C filters ripple components and spurious signals that would otherwise appear across the terminals of the battery 700 as a result of the switching action of the DC/DC converter 100.

Figure 4:
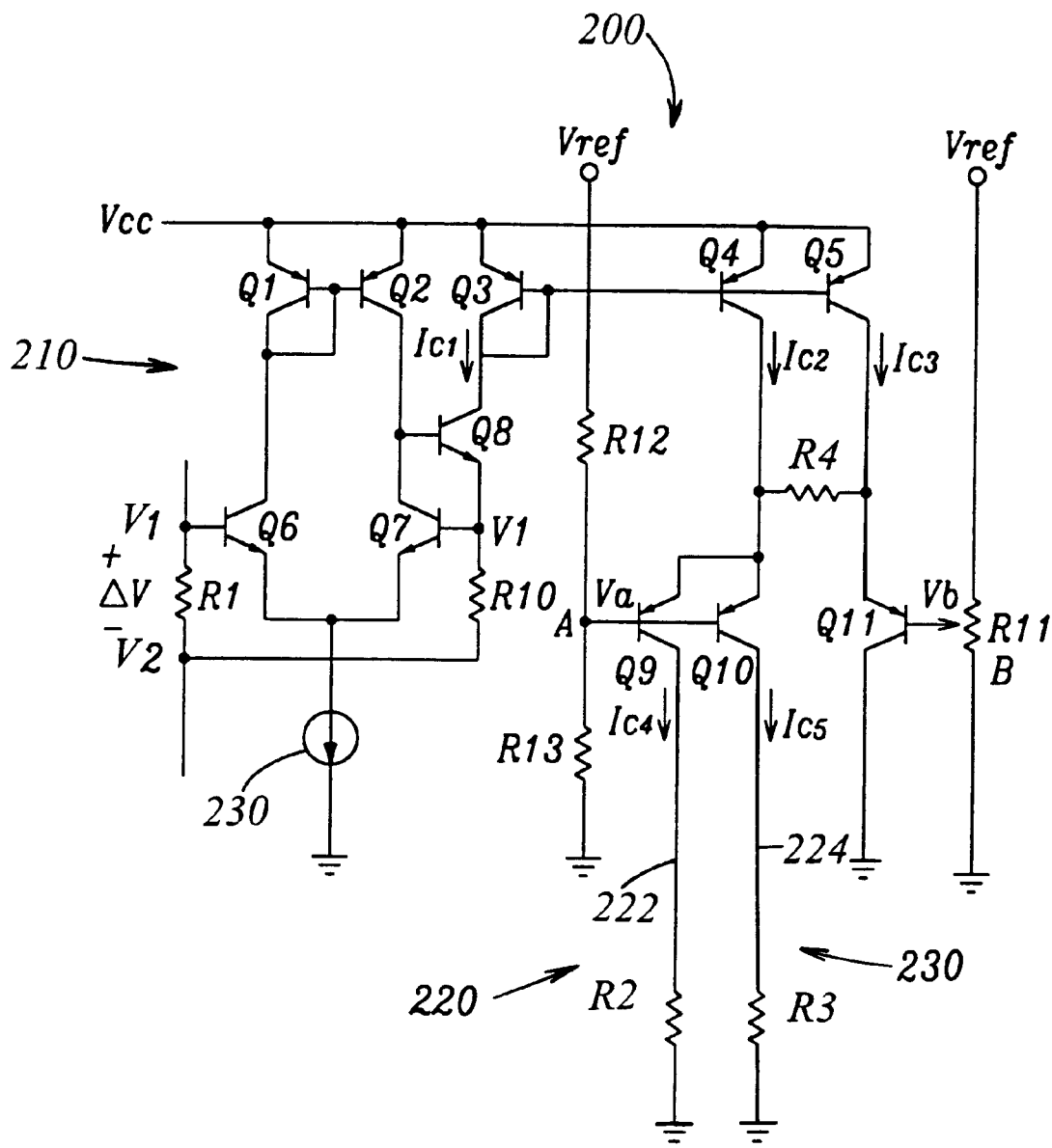
FIG. 4 is an exemplary schematic diagram of the gain controller of FIG. 3.

FIG. 4 is an exemplary schematic diagram of the gain controller 200 of FIG. 3. The gain controller 200 includes a plurality of PNP transistors Q1–Q5, Q9–Q11, a plurality of NPN transistors Q6, Q7, a plurality of resistors R2–R4, R10–R13, and a current source 230, all coupled together as shown. The transistors Q1–Q5 are connected in a current mirror configuration such that Q2 mirrors the current of Q1, and Q4–Q5 each mirror the current in Q3.

The current sense amplifier 210 includes transistors Q6–Q7, resistor R10, and the current source 230, which are connected in a differential amplifier configuration, and the transistors Q3 and Q8, which provide a current Ic1 that is mirrored into transistors Q4 and Q5. Transistor Q8 is connected in a voltage buffer configuration to buffer the voltage V1 at the base terminal of Q7.

Transistors Q9 and Q10 together with resistors R2 and R3 form the output stage of the first and second gain units 220, 230. The transistors Q9–Q11 and resistor R4 are connected in a differential amplifier configuration that amplifies the difference between the fixed reference voltage Va, which is formed by resistors R12 and R13 and the variable reference voltage reference Vb, which is determined by the adjusted value of resistor R11.

In operation, the charging current flowing through resistor R1 develops a voltage difference V1–V2=ΔV. The voltage difference ΔV generates currents Ic1, Ic2, and Ic3 according to Equation 1 below.

$$Ic1 = Ic2 = Ic3 = \frac{\Delta V}{R10} \qquad \text{Equation 1}$$

The currents Ic4 and Ic5 flowing in the collectors of transistors Q9 and Q10, respectively, are generated according to Equations 2 and 3 below.

$$Ic4 = \frac{Ae4}{Ae4 + Ae5}\left[Ic2 + \frac{Vb - Va}{R4}\right] \qquad \text{Equation 2}$$

$$Ic5 = \frac{Ae5}{Ae4 + Ae5}\left[Ic2 + \frac{Vb - Va}{R4}\right] \qquad \text{Equation 3}$$

The values Ae4 and Ae5 represent the number of individual transistors used in making the transistors Q9 and Q10, respectively. For example, if the circuit shown in FIG. 4 is implemented using integrated circuit technology then transistors Q9 and Q10 could be implemented as multiple transistors connected in parallel. Thus, where Q9 and Q10 are each made of a single transistor then Q9 and Q10 spilt the total available current equally so that Ic4=Ic5. However, where the number of transistors making up Q9 and Q10 is unequal, the total available current is shared according to the ratio of the number of transistors making up Q9 or Q10 divided by the total number of transistors making up both Q9 and Q10.

The value of Va is fixed by the ratio R13/R12 to be a portion of the reference voltage Vref, and the voltage Vb is adjusted to cause a current to flow through R4, which is summed with the current Ic2. As can be seen from Equations 2 and 3 above, the value of Vb can be adjusted to change the values of Ic4 and Ic5 that are produced in response to a given Ic2, which is proportional to the charging current flowing through R1. Accordingly, Vb adjustments that change Ic4 will affect the transfer function of the first gain unit 220, thereby affecting the maximum charging current. Similarly, Vb adjustments that change Ic5 will affect the transfer function of the second gain unit 230, thereby affecting the termination charging current.

The maximum and minimum (i.e., termination) charging currents can be represented according to Equations 4 and 5 below.

$$Imax = \frac{Vhys}{R1 * K * gm1 * R2} \qquad \text{Equation 4}$$

$$Imin = \frac{Vcomp}{R1 * K * gm2 * R3} \qquad \text{Equation 5}$$

Where K=1/R10, which is the gain of the current sense amplifier 210, gm1=Ae4/(A4+Ae5), which is representative of the gain of the first transconductance amplifier 226, and gm2=Ae5/(Ae4+Ae5), which is representative of the gain of the second transconductance amplifier 228.

The ratio of the termination current Imin to the maximum charging current Imax yields a constant value as represented in Equation 6 below.

$$\frac{Imin}{Imax} = \frac{Vcomp * gm1}{Vhys * gm2} = \text{constant} \qquad \text{Equation 6}$$

As Equation 6 shows, if the maximum charging current Imax is increased to accommodate a large battery capacity the value of Imin is adjusted upward so that the ratio of Imin/Imax does not change.

Figure 5:
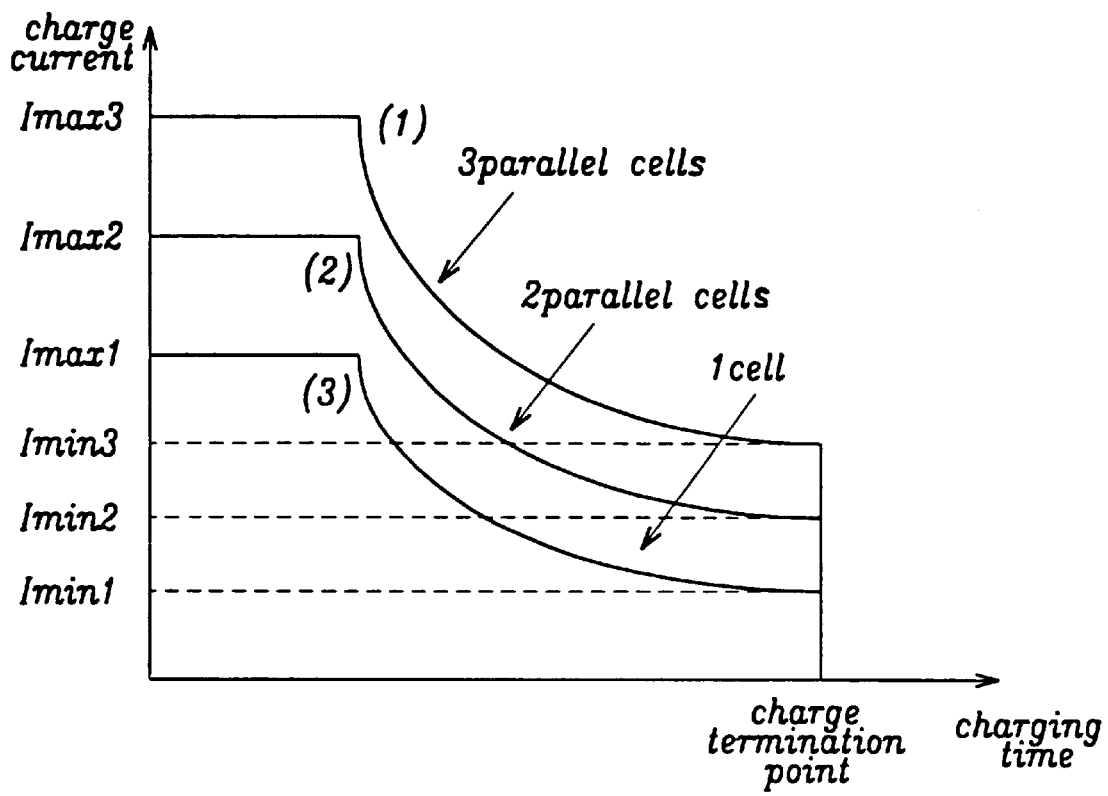
FIG. 5 is a graph illustrating the relationship between charge currents and charging time for different battery capacities using the charge controller of FIG. 2.

FIG. 5 is a graph illustrating the relationship between charge currents and charging time for different battery capacities using the charge controller 90 of FIG. 2. Curves (1), (2), and (3) correspond to the charging currents applied to rechargeable batteries having different capacities. For example, curves (1), (2), and (3) represent the charging current for a single cell, two cells, and three cells, respectively.

At the beginning of the charging process, the pulse-width controller 300 varies the duty cycle of the switch S1 so that the charging current is limited to a desired maximum value (e.g., Imax3, Imax2, and Imax3). As the battery 700 begins to charge, the charge voltage 602 on the battery 700 increases and causes the pulse-width controller 300 to further reduce the duty cycle of the switch S1. As a result, the charging current begins to decrease as shown in FIG. 5.

At the end of the charging process, the charging current decreases to a point at which the charge termination signal 502 causes the pulse-width controller 300 to terminate the charging process at a desired minimum charging current (e.g., Imin1, lmin2, and Imin3). As shown by FIG. 5, the curves (1), (2), and (3) have substantially identical charge termination points such that the charging process terminates at the same point regardless of the capacity of the battery being charged. Additionally, these curves illustrate the fact that the charge controller 90 (FIG. 2) of the invention, results in a termination current that is ratiometric with respect to the maximum desired charging current, which is selected according to the capacity of the battery 700 that is being charged.

A range of changes and modifications can be made to the preferred embodiment described above. The foregoing detailed description should be regarded as illustrative rather than limiting and the following claims, including all equivalents, are intended to define the scope of the invention.

What is claimed is:

1. A battery charge controller, comprising:
   a DC/DC converter coupled to a supply voltage that provides a charging current to a battery;
   a gain controller coupled to the DC/DC converter that provides first and second gain-adjusted signals associated with the charging current;
   a charge termination detector that compares the level of the second gain-adjusted signal to a first predetermined reference signal and generates a charge termination signal based on the comparison; and
   a pulse-width controller coupled to the DC/DC converter that compares each of the charge termination signal, the first gain-adjusted signal, and a charging voltage of the battery to a second predetermined reference signal to vary a duty cycle of the DC/DC converter to vary the charging current supplied to the battery.

2. The controller of claim 1, wherein the pulse-width controller reduces the duty cycle of the DC/DC converter based on the comparison of the first gain-adjusted signal to the second reference signal to limit the charging current to a maximum charging current, and wherein the pulse-width controller turns off the DC/DC converter to stop charging the battery based on the comparison of the charge termination signal to the second reference signal when the charging current is less than a minimum charging current.

3. The controller of claim 2, wherein the ratio of the maximum and minimum charging currents is a constant value.

4. The controller of claim 1, further comprising a low pass filter that is serially coupled between the gain controller and the charge termination detector, wherein the filter is adapted to remove ripple components from the second gain-adjusted signal.

5. The controller of claim 1, wherein the gain controller unit comprises:
   a current sense amplifier that senses the charging current and generates an amplified voltage therefrom;
   a first gain unit coupled to the current sense amplifier that generates the first gain-adjusted signal based on the amplified voltage; and
   a second gain unit coupled to the current sense amplifier that generates the second gain-adjusted signal based on the amplified voltage.

6. The controller of claim 5, wherein the first gain unit comprises a first transconductance amplifier and a resistor coupled between an output terminal of the first transconductance amplifier and a ground potential.

7. The controller ot claim 5, wherein the second gain unit comprises a second transconductance amplifier and a resistor coupled between an output terminal of the second transconductance amplifier unit and a ground potential.

8. The controller of claim 1, wherein the DC/DC converter comprises:
   a switch that is controlled by the pulse-width controller;
   a free wheeling diode having a cathode coupled to the switch and an anode connected to a ground potential;
   an inductor coupled to the free wheeling diode; and
   a resistor serially coupled between the inductor and the battery.

9. The controller of claim 1, wherein the gain controller comprises:
   first, second, third, fourth, and fifth transistors of a first type forming at least one current mirror, each said transistor having an emitter coupled to the supply voltage;
   sixth and seventh transistors of a second type having base terminals sensing a current flowing through the DC/DC converter, and collectors coupled to respective collectors of the first and second transistors, the sixth and seventh transistors forming a differential amplifier circuit, and each of said sixth and seventh transistors having an emitter;
   a current source coupled to the emitters of the sixth and seventh transistors;
   an eighth transistor of the second type having an emitter coupled to the collector and the base of the seventh transistor, and a collector coupled to a collector and base of the third transistor;
   ninth and tenth transistors of the first type having emitters coupled to a collector of the fourth transistor, bases coupled to a power terminal to which variable power is provided, and collectors forming output terminals that are coupled respectively to the pulse-width controller and the charge termination detector;
   a second resistor having a first end coupled to the bases of the ninth and tenth transistors a second end coupled to a variable power;
   a third resistor having a first end coupled to the bases of the ninth and tenth transistors and a second end that is grounded;
   a fourth resistor coupled to a reference voltage;
   an eleventh transistor of the first type having an emitter coupled to a collector of the fifth transistor, and a collector that is grounded, a voltage at the fourth resistor being provided to a base of the eleventh transistor; and
   a fifth resistor coupled between the emitters of the tenth and eleventh transistors.

* * * * *